(12) United States Patent
Fujita et al.

(10) Patent No.: US 6,412,753 B2
(45) Date of Patent: Jul. 2, 2002

(54) EGR VALVE DEVICE

(75) Inventors: Youichi Fujita; Sotsuo Miyoshi; Toshihiko Miyake; Satoshi Kawamura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,076

(22) Filed: Jul. 16, 2001

Related U.S. Application Data (63) Continuation of application No. PCT/JP99/06456, filed on Nov. 18, 1999.

(51) Int. Cl.[7] .............................................. F16K 31/02
(52) U.S. Cl. ............................ 251/129.11; 123/568.23
(58) Field of Search ............................ 251/65, 129.01, 251/129.11, 129.12, 129.13; 123/568.23, 568.24

(56) References Cited

U.S. PATENT DOCUMENTS

| | | | |
|---|---|---|---|
| 2,465,224 A | 3/1949 | Hansen et al. ................ | 172/36 |
| 4,347,453 A | 8/1982 | Gaus ........................... | 310/104 |
| 5,351,935 A | * 10/1994 | Miyoshi et al. ......... | 251/129.11 |

FOREIGN PATENT DOCUMENTS

| | | | | |
|---|---|---|---|---|
| JP | 59-81271 | 6/1984 | .......... | H02K/13/00 |
| JP | 10-220620 | 8/1998 | .......... | F16K/31/04 |
| JP | 11-132110 | 5/1999 | .......... | F02M/25/07 |

OTHER PUBLICATIONS

International Search Report.

* cited by examiner

Primary Examiner—William C. Doerrler
Assistant Examiner—Patrick Buechner
(74) Attorney, Agent, or Firm—Sughrue Mion, PLLC

(57) ABSTRACT

A rotor 55 having magnets 57 is assembled to rotate freely by bearings 58, 59 with respect to a stator which comprises coils 54 and stator cores 53. A current carrying device is formed from motor brushes 73, and slip rings 75 and commutator pieces 74 of a disk-shaped feeding unit 72, and the current carrying device is arranged on an outer side opposite to a side arranging the magnets 57 on a rotational axis X of the rotor 55 with respect to the bearing 58.

10 Claims, 7 Drawing Sheets

EGR VALVE DEVICE

CROSS-REFERENCE TO THE RELATED APPLICATION

This application is a continuation of International Application No. PCT/JP99/06456, whose International filing date is Nov. 18, 1999, which was published under PCT Article 21 (2) in Japanese, the disclosures of which Application are incorporated by reference herein.

BACKGROUND OF THE INVENTION

1. Field of the Invention

The present invention relates to an EGR (Exhaust Gas Recirculation) valve device which comprises, for example, a recycling system for exhaust gases.

Description of Related Art

Conventional examples of this type of EGR valve have been used with a stepping motor to open and close valves. However use of a DC motor instead of a stepping motor has developed in order to increase output, improve response characteristics and improve limits in the resolution of valve aperture regulation.

Figure 1:
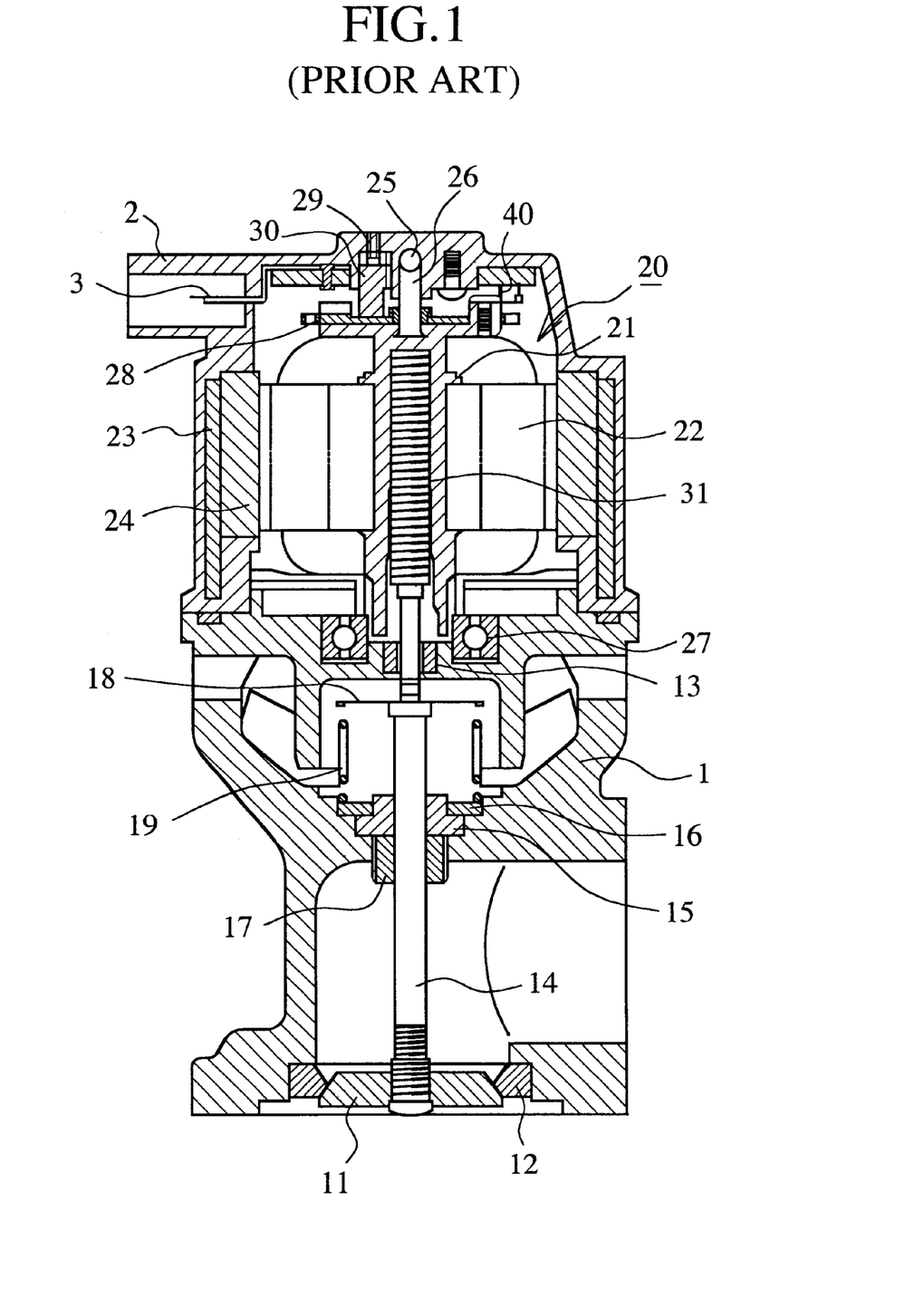
FIG. 1 is a longitudinal cross section of a conventional EGR valve device.

FIG. 1 is a longitudinal cross section of an EGR valve device as disclosed in Published Unexamined Japanese Patent Application H10-220620 (1998) for example. In FIG. 1, reference numeral 1 denotes a valve body, 2 denotes a motor case, 3 denotes a connector terminal, 11 denotes a valve which opens and closes an exhaust gas passage by vertical arrangement, 12 denotes a seat which maintains a degree of aperture in response to a vertical arrangement of the valve 11, 13 denotes a guide bush, 14 denotes a shaft with a valve 11 fitted to a lower end, 15 denotes a guide seal, 16 denotes a guide plate, 17 denotes a guide seal cover, 18 denotes a spring seat, 19 denotes a spring which pushes the shaft 14 in a direction of closure of the valve 11, and 20 denotes a motor. 21 denotes a rotor with a hollow space. A threaded portion is formed on an inner face of the hollow space.

22 denotes a coil, 23 denotes a yoke, 24 denotes a magnet, 25 denotes a slide ball, and 26 denotes a rotor shaft. A bearing, which supports an upper end of the rotor 21, comprises the slide ball 25 and the rotor shaft 26

27 denotes a bearing which supports a lower end of the rotor 21. 28 denotes a commutator which is integrally fitted to an upper end of the rotor 21. The motor brush 30 and the commutator 28 are arranged at a position on an upper end of the rotor 21 and below the bearing which supports an upper end of the rotor 21 which is composed of the rotor shaft 26 and the slide ball 25.

29 denotes a brush spring, 30 denotes a motor brush, 31 denotes a motor shaft which forms a threaded portion on an outer peripheral face. The threaded portion is threadably fitted to a threaded portion formed on an inner face of the hollow space of the rotor 21. 40 denotes a position sensor.

The operation of the conventional EGR valve device will be described below.

In this type of EGR valve, a fixed return torque is generated in a direction of closure of the valve 11 due to the spring 19, and a variable motor torque is generated in a direction of opening the valve 11 due to a current in one direction of the motor 20. Thus the opening and closing of the valve 11 is controlled by the balance of these torque components.

In the conventional EGR valve device comprised as discussed above, because a DC motor is used as a source of required torque to open and close the valves 11, a motor brush and a commutator are provided. The motor brush and the commutator are arranged below the slide ball 25 and on the upper end of the rotor 21. The rotor 21 itself can deviate vertically in an axial direction due to the repulsive force operating in an axial direction of the rotor 21 in conjunction with the opening and closing of the valve 11. Thus the problem has arisen that it is not possible to avoid adverse influence on a current carrying device such as a commutator or motor brush when a positional deviation of the rotor 21 occurs in an axial direction.

Furthermore, since the motor brush 30 and commutator 28 are arranged below the slide ball 25 and on the upper end of the rotor 21, the problem has arisen that motor failure is facilitated by foreign objects such as particulate matter generated by wear in the motor brush 30 entering the interior of the DC motor and accumulating in the gap between the magnet 24 and the rotating components of the motor such as the coil 22 or the like.

The current carrying device having the motor brush 30 and the commutator 28 is integrally fitted to an upper end of the rotor 21, and an upper end of the motor shaft 26 abuts with and rotates freely on the slide ball 25. Furthermore the rotating component of the motor such as the coil 22 is assembled so as to have a fixed gap with respect to the magnet 24. Thus the problem of low productivity during assembly has arisen.

SUMMARY OF THE INVENTION

The present invention is provided to solve the above-described problem, and the object of the present invention is to provide an EGR valve device which avoids adverse effects on the current carrying device by eliminating the possibility that the rotor will undergo a vertical deviation in an axial direction and which improves reliability of the device by preventing motor failure due to foreign objects such as particulate matter due to wear in the motor brush 30.

The present invention has the further object of providing an EGR valve which improves productivity when assembling the device.

The EGR valve device as defined by the present invention is provided with a motor rotating unit having a stator, in which each of a fixed number of coils is arranged in a peripheral direction of a stator core, and a rotor in which each of a plurality of magnets is fitted to an outer peripheral face corresponding to one coil of the stator, a valve drive mechanism for driving a valve linearly according to the rotation of the rotor of the motor rotating unit, a bearing for rotatably supporting the rotor, to which the magnets are fitted, with respect to the stator, and a current carrying device, which is arranged at a position placed on an outer side opposite to a side arranging the magnets on a rotational axis of the rotor with respect to the bearing, for commutating a direct current supplied from a power source according to a position of the rotor and supplying the commutated current to one coil of the stator.

With such a structure, it is possible to prevent adverse effects on the current carrying device due to the positional deviation of the rotor in an axial direction due to a repulsive force acting on the rotor when the valve driving mechanism drives the valve. Such adverse effects are prevented by the provision of the bearing arranged between the current carrying device and rotor which has the magnets. Thus it is possible to improve reliability of the valve device.

The EGR valve device as defined by the present invention is provided with the current carrying device comprising a plurality of slip rings, a plurality of commutator pieces and a plurality of motor brushes. A disk-shaped feeding unit comprises the slip rings and the commutator pieces, and the disk-shaped feeding unit is integrally fitted to an extension of the rotor which extends to the outer side opposite to the side arranging the magnets on the rotational axis of the rotor with respect to the bearing.

With such a structure, it is possible to prevent adverse effects on the slip rings and commutator pieces formed on the disk-shaped feeding unit due to the positional deviation of the rotor in an axial direction due to a repulsive force acting on the rotor when the valve driving mechanism drives the valve. Such adverse effects are prevented by the provision of the bearing arranged between the feeding unit and the rotor which has the magnets. Thus it is possible to improve reliability of the valve device.

The EGR valve device as defined by the present invention is provided with a shielding member which shields an opening between the motor rotating unit and the current carrying device.

In this way, it is possible to prevent motor failure that results from the accumulation of foreign objects in the rotating parts of the motor. The foreign objects (such as particulate matter) are generated as the parts of the current carrying device become worn. Thus it is possible to improve reliability of the valve device.

The EGR valve device as defined by the present invention is provided with the shielding member which is tightly fitted to an outer peripheral face of an outer ring of a bearing in which an inner peripheral face of an inner ring is tightly fitted to an outer peripheral face of the extension of the rotor to which the magnets are fitted. The shielding member seals the bearing, covers an open face of the motor rotating unit of the current carrying device and is arranged between the bearing and the current carrying device.

In this way, it is possible to prevent motor failure that results from the accumulation of foreign objects in the rotating parts of the motor. The foreign objects (such as particulate matter) are generated as the parts of the current carrying device become worn. Thus it is possible to improve reliability of the valve device.

The EGR valve device as defined by the present invention is adapted to assemble a current carrying device onto the extension of the rotor after assembling the rotating unit of the motor.

In this way, it is possible to perform assembly of the current carrying device in a separate process to the rotating unit of the motor and thus it is possible to improve productivity during assembly.

DETAILED DESCRIPTION OF THE PREFERRED EMBODIMENTS

The invention will now be described with reference to the accompanying drawings.

Embodiment 1

Figure 2A:
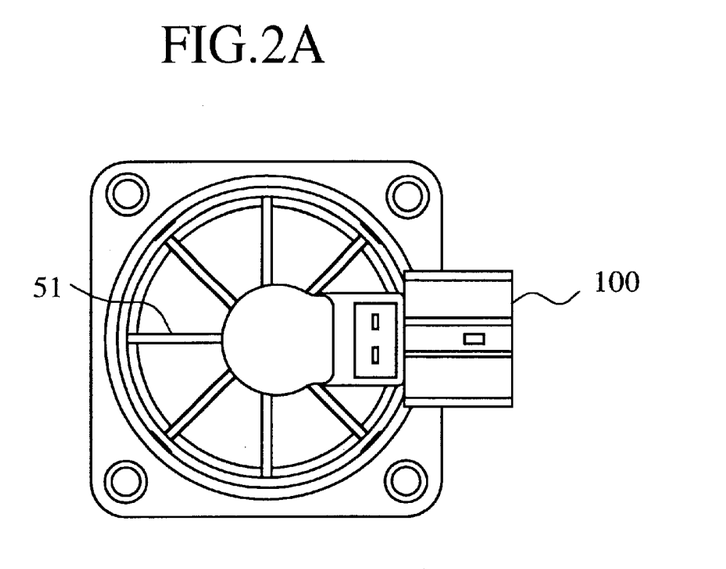
FIG. 2A is a plan view showing the structure of an EGR valve device according to a first embodiment of the present invention.
Figure 2B:
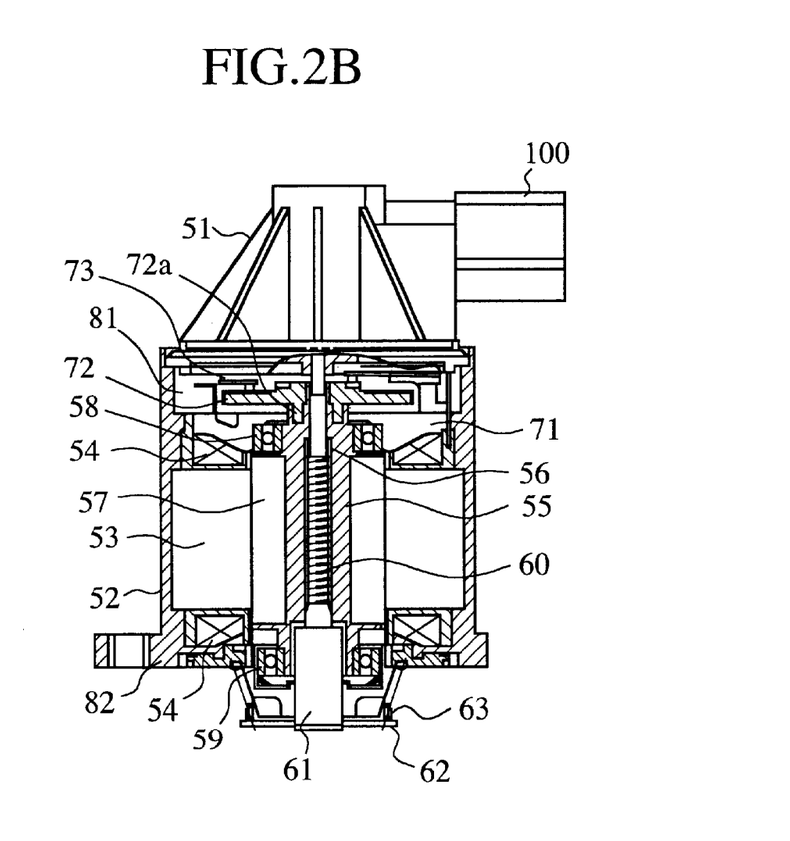
FIG. 2B is a sectional view of the EGR valve device according to the first embodiment of the present invention.
Figure 3A:
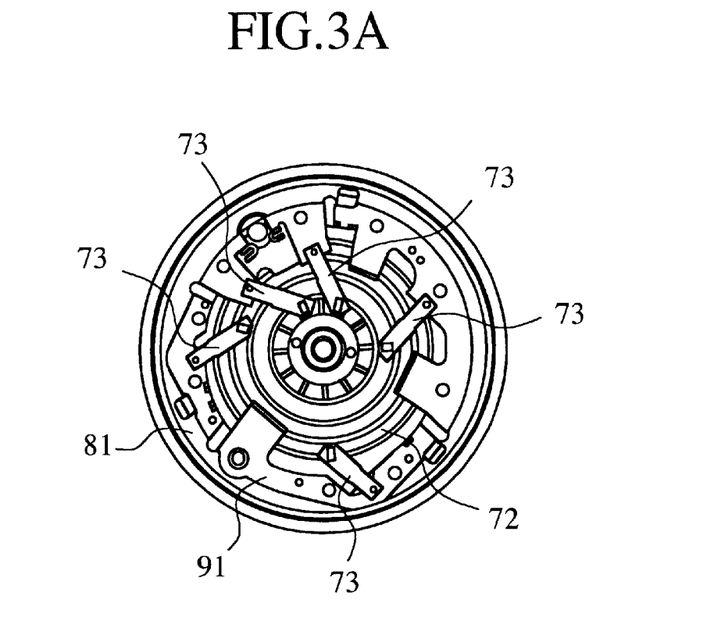
FIG. 3A is a plan view showing the structure of a current carrying device and motor rotating unit in an EGR valve device according to a first embodiment of the present invention.
Figure 3B:
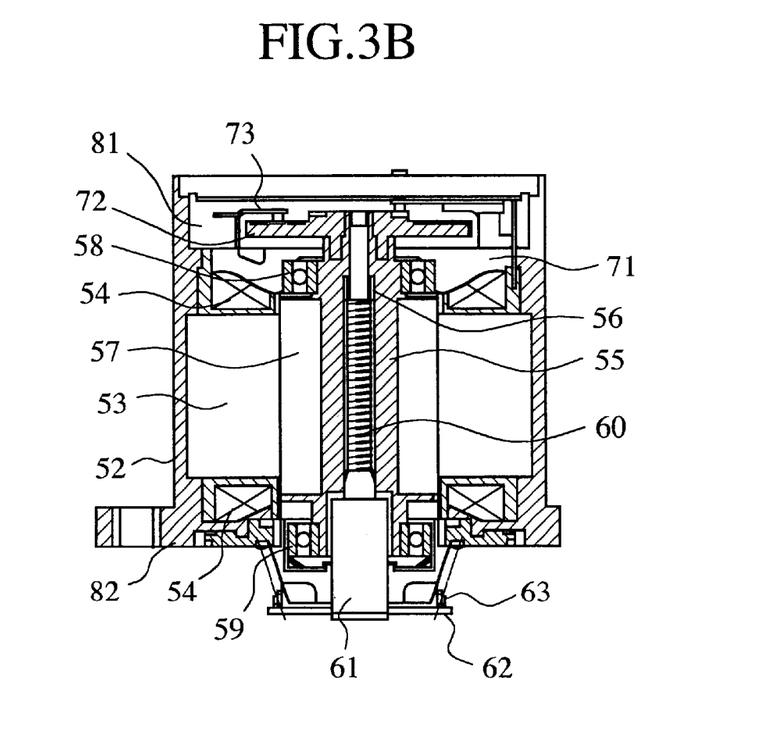
FIG. 3B is a sectional view of the current carrying device and motor rotating unit in an EGR valve device according to the first embodiment of the present invention.
Figure 4A:
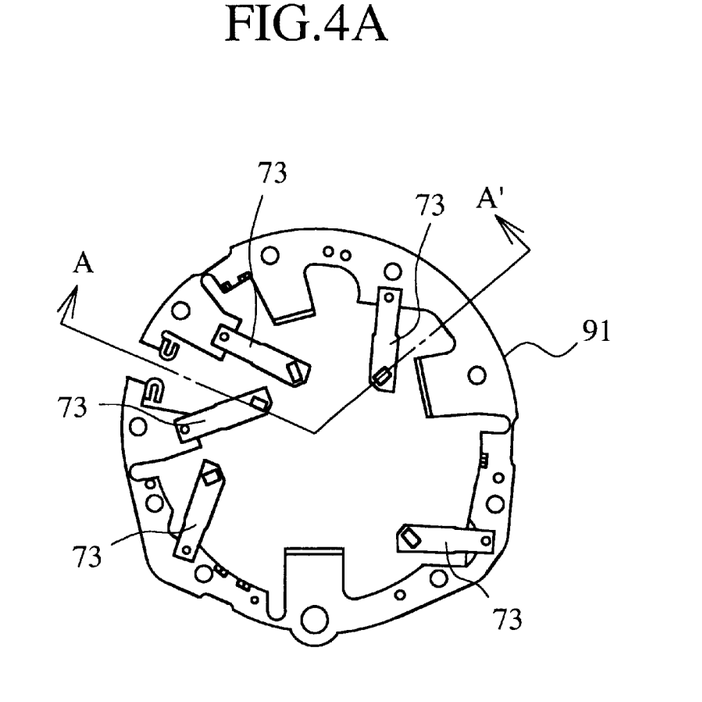
FIG. 4A is a plan view showing the structure of brush retaining plate and brushes of a current carrying device of an EGR valve device according to the first embodiment of the present invention.
Figure 4B:
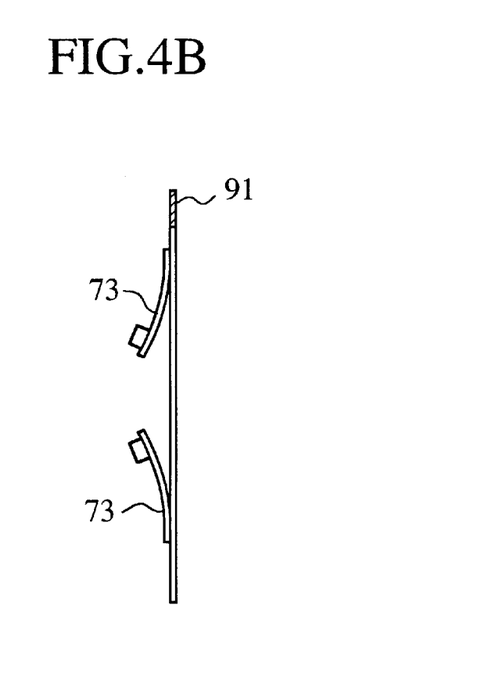
FIG. 4B is a sectional view of the brush retaining plate and brushs along the line A—A' of FIG. 4A.
Figure 5A:
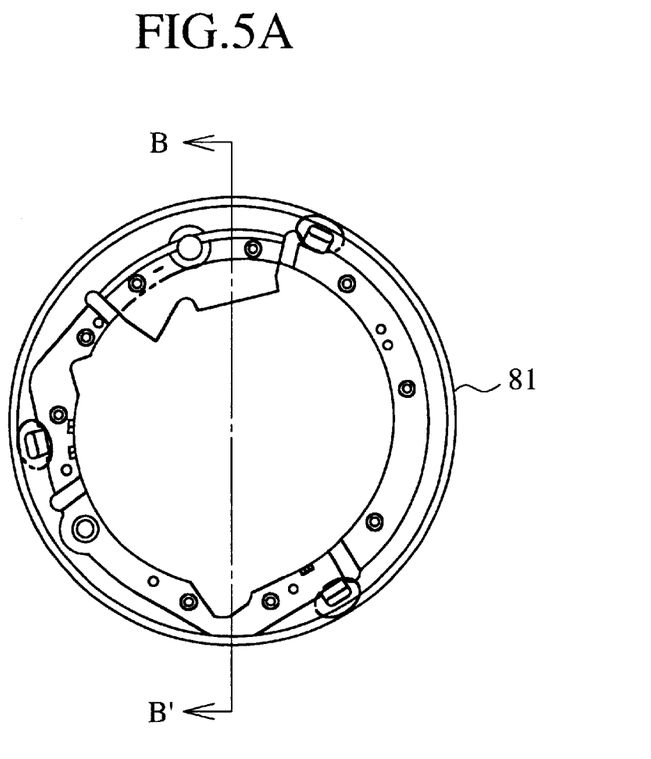
FIG. 5A is a plan view showing the structure of brush retaining plate fixing members of an EGR valve device according to the first embodiment of the present invention.
Figure 5B:
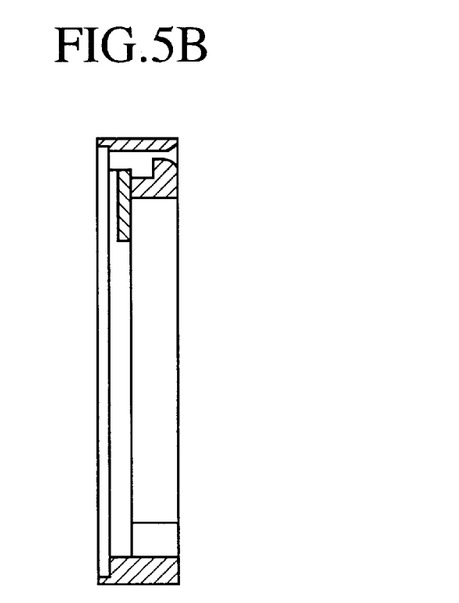
FIG. 5B is a plan view of the brush retaining plate fixing members along the line B—B' of FIG. 5A.
Figure 6A:
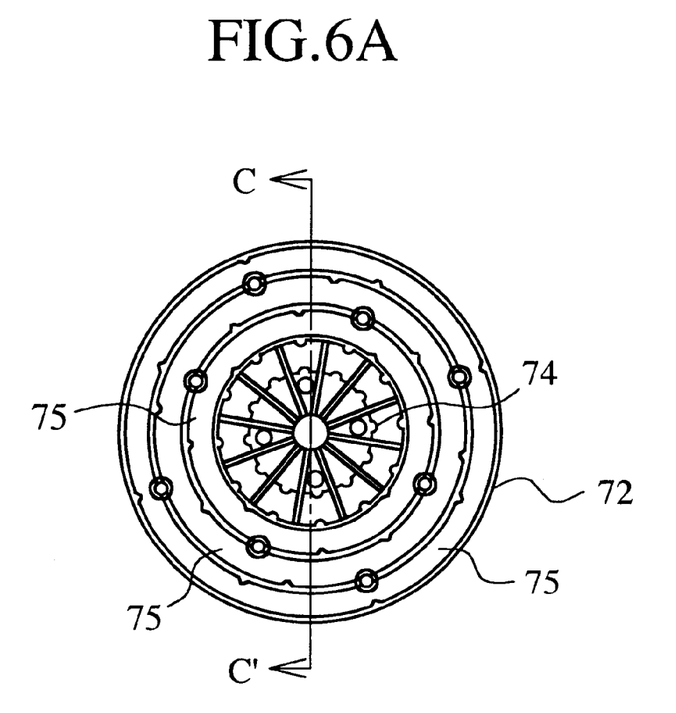
FIG. 6A is a plan view showing the structure of commutator pieces and slip rings formed on a disk-shaped feeding unit in a current carrying device of an EGR valve device according to the first embodiment of the present invention.
Figure 6B:
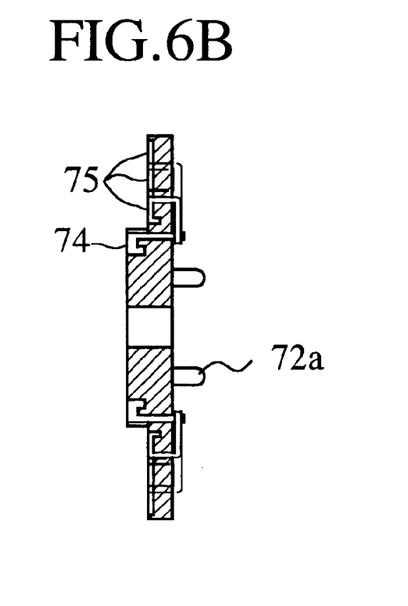
FIG. 6B is a sectional view of the commutator pieces and the slip rings along the line C—C' of FIG. 6A.
Figure 7A:
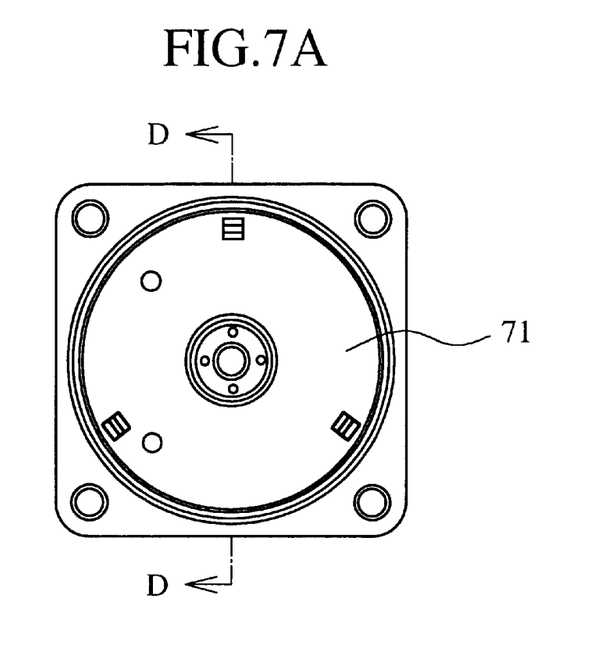
FIG. 7A is a plan view showing the structure of the motor rotating unit on the side arranging the current carrying device in an EGR valve device according to the first embodiment of the present invention.
Figure 7B:
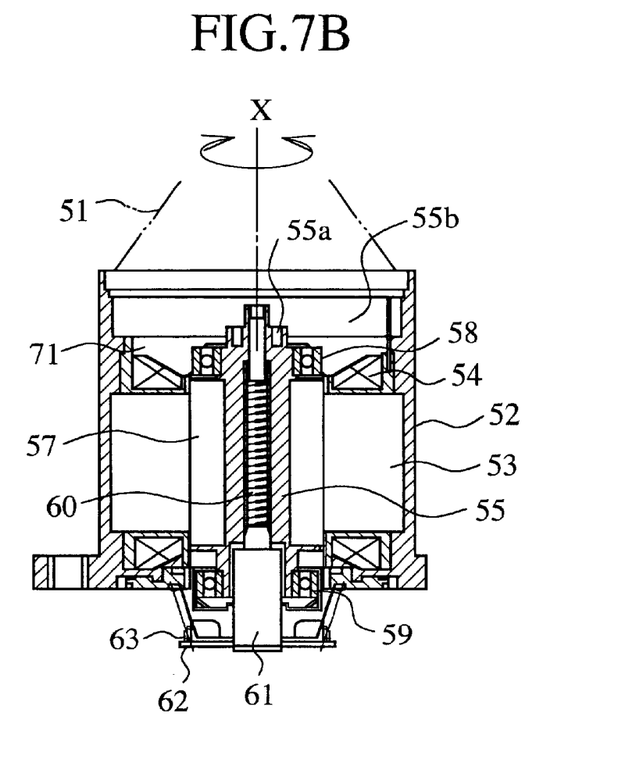
FIG. 7B is a sectional view of the motor rotating unit along the line D—D' of FIG. 7A.

FIG. 2A is a plan view showing the structure of an EGR valve device according to a first embodiment of the present invention. FIG. 2B is a sectional view of the EGR valve device according to the first embodiment of the present invention. FIG. 3A is a plan view showing the structure of a current carrying device and motor rotating unit in an EGR valve device according to a first embodiment of the present invention. FIG. 3B is a sectional view of the current carrying device and motor rotating unit in an EGR valve device according to the first embodiment of the present invention. FIG. 4A is a plan view showing the structure of brush retaining plate and brushes of a current carrying device of an EGR valve device according to the first embodiment of the present invention. FIG. 4B is a sectional view of the brush retaining plate and brushs along the line A—A' of FIG. 4A. FIG. 5A is a plan view showing the structure of brush retaining plate fixing members of an EGR valve device according to the first embodiment of the present invention. FIG. 5B is a plan view of the brush retaining plate fixing members along the line B—B' of FIG. 5A. FIG. 6A is a plan view showing the structure of commutator pieces and slip rings formed on a disk-shaped feeding unit in a current carrying device of an EGR valve device according to the first embodiment of the present invention. FIG. 6B is a sectional view of the commutator pieces and the slip rings along the line C—C' of FIG. 6A. FIG. 7A is a plan view showing the structure of the motor rotating unit on the side arranging the current carrying device in an EGR valve device according to the first embodiment of the present invention. FIG. 7B is a sectional view of the motor rotating unit along the line D—D' of FIG. 7A.

In the figures, reference numeral 51 denotes a sensor unit provided with a power supply terminal and a position sensor (not shown) for detecting the aperture of a valve, 52 denotes a mantle member of a valve driving unit which has a direct current (DC) motor in an inner space. The DC motor acts as a torque generation source for opening and closing the valve.

53 denotes each of a plurality of stator cores. 54 denotes each of a plurality of coils comprising a stator. The coils 54 are arranged at approximately equal intervals on the periphery of the series of stator cores 53. 55 denotes a rotor with a hollow space forming a threaded portion 56 on an internal face and which has a plurality of magnets 57 on an outer periphery. A fixed gap is formed between the outer peripheral face of the magnets 57 and the inner peripheral face of the stator core 53.

The motor rotating unit is formed by the coils 54, stator cores 53 and the magnets 57 of the rotor 55.

58 denotes a bearing which fixes an inner peripheral portion of an inner ring to an outer peripheral face of the extension 55b of the rotor 55 which has the magnets 57. An outer peripheral face of an outer ring of the bearing 58 is tightly fitted to a shielding member 71. The bearing 58 supports the rotor 55 on the side of the mantle member 52 of the valve driving unit. In the same manner, 59 denotes a bearing which supports the rotor 55 with the mantle member 52 of the valve driving unit on an end of the rotor 55 near to the magnets 57. The end of the rotor 55 is opposite to an arranging position of the sensor 51.

60 denotes a valve driving shaft (valve drive mechanism). The valve driving shaft 60 forms a threaded portion on an outer peripheral face and is threadably fitted to the threaded portion (valve drive mechanism) 56 formed on the inner face of the hollow space formed into the rotor 55. The valve driving shaft 60 is formed to be moved in an axial direction together with a rotational motion of the rotor 55. 61 denotes a valve shaft abutting member (valve drive mechanism) which abuts at a projecting end face with a valve shaft which supports a valve (not shown) with a tip. The valve shaft abutting member 61 is formed on the end of the valve driving shaft 60. 62 denotes a spring engagement plate (valve driving mechanism) which is fixed to an end of the valve shaft abutting member 61. 63 denotes a spring (valve driving mechanism) which is fixed at one end to a spring engagement plate 62 and is fixed at another end to a flange 82 of the mantle member 52 of the valve driving unit.

71 denotes a shielding member which is formed to prevent a positional deviation of the bearing 58 in an axial direction, in particular in a direction towards the sensor 51, by tightly attaching to an outer peripheral face of an outer ring of the bearing 58. The shielding member 71 covers the open face placed on a side of the sensor 51 of the motor rotating unit and valve driving unit, which is covered with the mantle member 52. That is to say, the shielding member 71 covers the open face placed on a side of the current carrying device comprised by slip rings 75, commutator pieces 74 and motor brushes 73. The shielding member 71 determines the position of the rotor 55 to a fixed position in the interior of the valve driving unit so as to rotate freely via the bearing 58. The covering unit 71 is arranged between the bearing 58 and the current carrying device comprised by the motor brushes 73, the commutator pieces 74, the slip rings 75 or the like.

72 denotes a disk-shaped feeding unit. The feeding unit 72 comprises commutator pieces 74 and slip rings 75 formed on one face. As shown in FIG. 6A, the commutator pieces 74 are obtained by dividing a ring-shaped conductor into a fixed number of pieces in a peripheral direction and are electrically insulated from each other. The slip rings 75 are obtained by dividing into a fixed number of ring shapes which correspond as necessary in a radial direction with a concentric shape with respect to the commutator pieces 74, and the slip rings 75 are electrically insulated from each other. A ring-shaped convex portion 72a is formed on the other face. Each commutator piece 74 and each slip ring 75 are connected with each other by a fixed internal connection.

The disk-shaped feeding unit 72 is fixed to an end of the extension 55b of the rotor 55 which extends in the direction of a rotational axis X of the rotor of the outer sensor unit 51 via a bearing 58, and the disk-shaped feeding unit 72 is formed to rotate integrally with the rotor 55. This is due to the ring-shaped convex portion 72a being tightly fitted to the ring-shaped concave portion 55a which is formed on an end of the rotor 55 which is positioned in the sensor 51 via a bearing 58 as shown in FIG. 7A and FIG. 7B.

73 denotes motor brushes, each of which is fixed at a fixed position on a brush retaining plate 91 as shown in FIG. 4A and FIG. 4B. The connection on the tip of each motor brush 73 makes electrical contact with the slip ring 75 and the commutator piece 74 formed on the disk-shaped feeding unit 72. A DC power source which is externally supplied supplies a current to the coils 54 forming the stator in response to the rotating position of the rotor 55. A plurality of brush retaining plates (current carrying device) 91 corresponding to the motor brushes 73 in one-to-one correspondence are separated from each other and fix the motor brushes 73. Therefore, a current does not pass between motor brushes 73 through the corresponding brush retaining plate 91. A current carrying device comprises the slip rings 75, the commutator pieces 74 of the disk-shaped feeding unit 72 and the motor brushes 73. The current carrying device is arranged at a position placed on an outer side of the rotor 55 opposite to the attaching side of the magnets 57 on a rotation axis X of the rotor 55 with respect to the bearing 58.

81 denotes a brush retaining plate fixing member which fixes the brush retaining plates 91, each of which retains the motor brush 73 to a fixed position. The brush retaining plate fixing member 81 stores a current carrying device, which comprises the slip rings 75 and the commutator pieces 74 of the disk-shaped feeding unit 72 and the motor brushes 73, in an internal space. A fitting hole and the like for fixing each brush retaining plate 91 to a fixed position as shown in FIG. 5A and FIG. 5B is formed.

100 denotes a power source supply terminal storage unit which forms a power supply terminal of the sensor unit 51 in an internal space.

The operation of the invention will be described below.

The EGR valve device comprises a motor rotating unit and a current carrying device. The motor rotating unit is provided with the coils 54, the stator cores 53 and the magnets 57 of the rotor 55. The current carrying device is provided with the slip rings 75, the commutator pieces 74, which are formed on the disk-shaped feeding unit 72, and the motor brushes 73. A DC motor which has a coil on the stator side and has a magnet on the rotor side is provided to act as a source of drive power to perform opening and closing of valves. An electrical current and the direction of the electrical current which is supplied to the coil 54 on the stator side is switched in response to the rotation position of the rotor 55 by the slip rings 75 and the commutator pieces 74 of the disk-shaped feeding unit 72.

The DC current source which is input from a power source supply terminal which is formed in the power source supply terminal storage unit 100 is supplied to one motor brush 73 retained on one brush retaining plate 91. The DC power source which is supplied to the brush retaining plate 73 is commutated in response to the position of the rotor 55 by the fixed connection between one commutator piece 74 and one slip ring 75 of the disk-shaped feeding unit 72 which rotates together with the rotor 55. That is to say, one coil 54 is determined to supply an electrical current to the coil 54 in response to the position of the rotor 55. The direction of that current is also determined and is supplied to each coil 54 of the stator 53 through another motor brush 73. As a result, a rotating torque is generated in the rotor 55 of the motor rotating unit of the EGR valve device due to the mutual operation of the magnetic field of the magnets 57 of the rotor 55 and the magnetic field generated by the coil 54. Thus the rotor 55 rotates. When the rotor 55 rotates, the valve driving shaft 60 is linearly moved in an axial direction according to a rotation direction of the rotor 55. The valve driving shaft 60 has a threaded portion which is threadably engaged with the threaded portion 56 formed on an inner peripheral face of the hollow space of the rotor 55.

When the valve driving shaft 60 is moved in a direction which projects from the hollow space of the rotor 55, the valve driving shaft 60 and the valve shaft abutting member 61 depress a valve (not shown) resisting the pushing force of the spring 63, drive the valve in an opening direction and increase the degree of valve aperture. On the other hand, when the valve driving shaft 60 is moved in a direction which enters the hollow space of the rotor 55, the valve driving shaft 60 and the valve shaft abutting member 61 do not operate as a driving force for closing the valve, and the valve is pushed to move in a direction of closure due to the pushing force of the spring 63 only to the degree the valve driving shaft 60 has entered the hollow space of the rotor. Thus the degree of valve aperture is reduced.

The rotor 55 is fixed to rotate freely on the mantle member 52 of the valve driving unit by bearings 58, 59 in proximity to both ends of the magnets 57 fitted to the rotor 55. Furthermore a current carrying device which is provided with the slip rings 75, the commutator pieces 74 comprised on the disk-shaped feeding unit 72 and the motor brushes 73 is fitted to the rotor 55 on the side of the sensor 51 with respect to the bearing 58. Thus the distance between the bearings 58, 59 is reduced and the rigidity of the structure is increased. Thus the generation of a positional deviation in an axial direction by the rotor 55 due to a repulsive force which operates in an axial direction of the rotor 55 together with the opening and closing of the valves is eliminated.

A current carrying device which is provided with the slip rings 75, the commutator pieces 74 comprised by the disk-shaped feeding unit 72 and the motor brushes 73 is fitted to the end of the extension 55b of the rotor 55 which is placed on the side of the sensor 51 with respect to the bearing 58 on the rotational axis X of the rotor 55. Thus the influence of mechanical bending or the like operating on the disk-shaped feeding unit 72 due to a repulsive force which operates in an axial direction of the rotor 55 together with the opening and closing of the valves is eliminated by the bearings 58, 59. Thus it is possible to reduce to extremely low levels any influence on the slip rings 75 and the commutator pieces 74 of the disk-shaped feeding unit 72.

The outer peripheral portion of the outer ring of the bearing 58 is tightly fitted to the shielding member 71. The shielding member 71 covers the open face of the sensor 51 of the valve driving unit between the bearing 58 and the current carrying device. That is to say, the shielding member 71 covers the open face of the current carrying device of the motor rotating unit. Thus it is possible to realize the advantage of sealing the bearing 58 and the advantage of preventing the entry of particulate matter such as dust from wear which is generated by wear of the motor brush or the like.

The processing of assembling the EGR valve device will be described below.

Firstly the valve driving unit which comprises the rotor 55, the bearing 59, the coils 54, the stator cores 53 is assembled into the interior of the mantle member 52. Thereafter the open face of the sensor unit 51 of the valve driving unit, the periphery of which is covered by the mantle member 52, is covered by the shielding member 71. The outer peripheral face of the outer ring of the bearing 58 is tightly fitted to the shielding member 71 and the inner peripheral face of the inner ring of the bearing 58 is tightly fitted to the outer peripheral face of the extension 55b of the rotor 55. Therefore, the open face of the sensor unit 51 of the valve driving unit is covered by the covering unit 71. This arrangement is shown in FIG. 7A and FIG. 7B.

Thereafter the brush retaining plate fixing member 81 shown in FIG. 5A and FIG. 5B is inserted into the inner face of the end of the mantle member 52 so that the brush retaining plate fixing member 81 shown in FIG. 5A and FIG. 5B is assembled into the mantle member 52.

The disk-shaped feeding unit 72 shown in FIG. 6A and FIG. 6B is fixed to the rotor 55 by tightly attaching the ring-shaped convex portion 72a of the disk-shaped feeding unit 72 to the ring-shaped concave portion 55a formed on the extension 55b of the rotor 55.

Thereafter a non-divided plate of the brush retaining plates 91, each of which retains one motor brush 73 as shown in FIG. 4A and FIG. 4B to a fixed position, is fixed to a fixed position on the brush retaining plate fixing member 81 which is inserted into the inner face of the end of the mantle member 52. FIG. 3A and FIG. 35B show the above arrangement. However, as another assembling procedure, after a non-divided plate of the brush retaining plates 91 is fixed beforehand to a fixed position on the brush retaining plate fixing member 81, the brush retaining plate fixing member 81 may be inserted into the inner face of the end of the mantle member 52.

Thereafter the non-divided plate of the brush retaining plates 91 is divided into the brush retaining plates 91 corresponding to the motor brushes 73 in-one-to-one correspondence to electrically insulate the motor brushes 73 from each other. At this time, each motor brush 73 makes electrical connection with one slip ring 75 or one commutator piece 74 of the disk-shaped feeding unit 72.

Accordingly, after the motor rotating unit is assembled into the mantle member 52, the current carrying device which is comprised by the motor brushes 73, and the slip rings 75 and the commutator pieces 74 of the disk-shaped feeding unit 72 can be assembled into the extension 55b of the rotor 55 of the motor rotating unit. Thus it is possible that the assembling of the motor rotating unit can be performed in a step different from that in which the assembling of the current carrying device is performed. Therefore an EGR valve device is obtained which allows improvements of productivity during assembly.

As shown above, an EGR valve device according to the present invention is adapted for allow improvements in reliability of a recirculation system for vehicle exhaust gases.

What is claimed is:

1. An EGR valve device comprising:
   a motor rotating unit having a stator, in which each of a fixed number of coils is arranged in a peripheral direction of a stator core, and a rotor in which each of a plurality of magnets is fitted to an outer peripheral face corresponding to one coil of the stator;
   a valve drive mechanism for driving a valve linearly according to the rotation of the rotor of the motor rotating unit;
   a bearing for rotatably supporting the rotor, to which the magnets are fitted, with respect to the stator; and a current carrying device, which is arranged at a position placed on an outer side opposite to a side arranging the magnets on a rotational axis of the rotor with respect to the bearing, for commutating a direct current supplied from a power source according to a position of the rotor and supplying the commutated current to one coil of the stator;

wherein the rotor and the current carrying device are rotatable together via a mechanical coupling.

2. An EGR valve device according to claim 1, wherein the current carrying device comprises a plurality of slip rings, a plurality of commutator pieces and a plurality of motor brushes, a disk-shaped feeding unit comprises the slip rings and the commutator pieces, and the disk-shaped feeding unit is integrally fitted to an extension of the rotor which extends to the outer side opposite to the side arranging the magnets on the rotational axis of the rotor with respect to the bearing.

3. An EGR valve device according to claim 2, further comprising a shielding member which shields an opening between the motor rotating unit and the current carrying device.

4. An EGR valve device according to claim 3, wherein the shielding member is tightly fitted to an outer peripheral face of an outer ring of the bearing in which an inner peripheral face of an inner ring is tightly fitted to an outer peripheral face of the extension of the rotor on which the magnets are fitted, and the shielding member seals the bearing, covers an open face of the motor rotating unit placed toward the current carrying device and is arranged between the bearing and the current carrying device.

5. An EGR valve device according to claim 1, wherein the current carrying device is assembled onto an extension of the rotor after assembling the motor rotating unit.

6. An EGR valve device comprising:

a motor rotating unit having (1) a stator with a core on which a plurality of coils are provided, and (2) a rotor with an outer peripheral face on which a plurality of magnets are provided;

a valve drive mechanism for linearly driving a valve according to the rotation of the rotor;

a bearing rotatably supporting the rotor with respect to the stator; and a current carrying device for (1) commutating a direct current supplied from a power source according to a position of the rotor and (2) supplying the commutated current to one coil of the stator;

wherein the bearing is positioned along a rotational axis of the rotor between the current carrying device and the magnets; and wherein the rotor and the current carrying device are rotatable together via a mechanical coupling.

7. An EGR valve device according to claim 6, wherein the current carrying device comprises a plurality of slip rings, a plurality of commutator pieces and a plurality of motor brushes, the slip rings and the commutator pieces forming a disk-shaped feeding unit, and wherein the disk-shaped feeding unit is fitted to an extension of the rotor.

8. An EGR valve device according to claim 7, further comprising a shielding member which shields an opening between the motor rotating unit and the current carrying device.

9. An EGR valve device according to claim 8, wherein the shielding member is fitted to an outer peripheral face of an outer ring of the bearing, and the extension is fitted to an inner peripheral face of an inner ring of the bearing, and wherein the shielding member seals the bearing, covers an open face of the motor rotating unit placed toward the current carrying device, and is arranged between the bearing and the current carrying device.

10. An EGR valve device according to claim 6, wherein the current carrying device is assembled onto an extension of the rotor.

* * * * *